US007317921B2

(12) United States Patent
Mueckenheim et al.

(10) Patent No.: US 7,317,921 B2
(45) Date of Patent: Jan. 8, 2008

(54) RESPONDING TO CHANGES IN MEASUREMENT OF SYSTEM LOAD IN SPREAD SPECTRUM COMMUNICATION SYSTEMS

(75) Inventors: Jens Mueckenheim, Nuremberg (DE); Philip Charles Sapiano, Wiltshire (GB); Seau Sian Lim, Wiltshire (GB)

(73) Assignee: Lucent Technologies Inc., Murray Hill, NJ (US)

( * ) Notice: Subject to any disclaimer, the term of this patent is extended or adjusted under 35 U.S.C. 154(b) by 431 days.

(21) Appl. No.: 11/109,257

(22) Filed: Apr. 19, 2005

(65) Prior Publication Data
US 2006/0234638 A1   Oct. 19, 2006

(51) Int. Cl.
*H04Q 7/20* (2006.01)
(52) U.S. Cl. ............... 455/452.1; 455/509; 455/115.2; 455/450; 370/335; 375/130
(58) Field of Classification Search ............ 455/452.1, 455/509, 115.2, 450, 442; 370/335; 375/130
See application file for complete search history.

(56) References Cited

U.S. PATENT DOCUMENTS

| | | | | |
|---|---|---|---|---|
| 6,078,817 | A * | 6/2000 | Rahman | 455/452.1 |
| 6,097,751 | A * | 8/2000 | Relph | 375/130 |
| 6,693,890 | B1 * | 2/2004 | Yick et al. | 370/342 |
| 2003/0187982 | A1 * | 10/2003 | Petit | 709/225 |
| 2007/0057952 | A1 * | 3/2007 | Swedberg et al. | 345/474 |

OTHER PUBLICATIONS

C. Comaniciu, et al. "Wireless Access to the World Wide Web in an Integrated CDMA System" *IEEE Transactions on Wireless Communications* vol. 2, No. 3, May 2003.

* cited by examiner

*Primary Examiner*—Matthew Anderson
*Assistant Examiner*—Minh Dao

(57) ABSTRACT

The present invention provides a method and an apparatus for responding to changes in measurement of a system load in a spread spectrum communication system. Using a load control algorithm, for example, the spread spectrum communication system may handle sudden changes or variations, such as spikes or steps in system load measurements for an uplink and/or a downlink between a mobile unit and an access network. The load control algorithm determines whether a sudden variation of a measured system load is generated by a source not under a power control or is caused by a variation of a spread spectrum communication system load. A load control measure may be selectively applied to adjust one or more parameters associated with the system load. That is, an increase of a first new measurement value may be limited to a given maximum increment for one sampling time period of a plurality of sampling time periods in response to a spike in the system load or a desired response to a sudden increase of the system load may be delayed by a given maximum number of measurement samples. By allowing a limited increase, the response of the spread spectrum communication system to sudden changes of a system load may be controlled such that some blocking may occur but dropping of calls may be avoided. In this manner, the load control algorithm may avoid unnecessary dropping of calls.

25 Claims, 7 Drawing Sheets

RESPONDING TO CHANGES IN MEASUREMENT OF SYSTEM LOAD IN SPREAD SPECTRUM COMMUNICATION SYSTEMS

BACKGROUND OF THE INVENTION

1. Field of the Invention

This invention relates generally to telecommunications, and more particularly, to wireless communications.

2. Description of the Related Art

Mobile communication systems are increasingly being utilized to transfer information, such as data, voice, text or video, among communication devices on a wireless network. To this end, a number of standards for network technologies and communication protocols have been proposed or suggested, rendering a variety of services to users. For example, third generation partnership project (3GPP) standardization has been introduced to provide IP based multimedia services to users based on the Universal Mobile Telecommunications System (UMTS) standard in a radio access network, such as a UMTS Terrestrial Radio Access Network (UTRAN).

A wireless communications system, for instance, a spread spectrum wireless communications system, such as code division multiple access (CDMA) system may allow multiple users to transmit simultaneously within the same wideband radio channel, enabling frequency re-use based on a spread spectrum technique. When moving within a particular wireless networks, such as a digital cellular CDMA network, a handover of mobile communications occurs for user equipment (UE) upon a user leaving an area of responsibility of a first cell, and into a new cell.

In a CDMA system, load control generally relates to maintaining a desired link quality level for existing users by avoiding too many users to be admitted into a single cell. The load control limits instances of user calls being dropped, in a particular cell, and may reduce affects on neighboring cells due to an inter-cell interference. Some common load control algorithms set a threshold for usage of a system resource. Examples of such a system resource include an estimate of power for each link or total transmit power for a base station, codes, number of users, throughput, and an interference level, or a combination thereof. A load control algorithm admits a user in a cell or allows a user to initiate a call as long as an estimate of a certain system resource, such as an uplink load between a mobile station and a base station, does not exceed a threshold.

Load measurement is one aspect of UMTS radio resource management that involves call admission control, congestion control and dynamic bearer control. In a CDMA system, such as based on the UMTS standard, a CDMA load may be measured by interference or power measurements. A load control may involve an uplink load measurement, which is based on uplink interference. Within a UMTS coverage area, the uplink load measurement is also known as received signal strength indicator (RSSI), which is measured in dBm.

In a UMTS Terrestrial Radio Access Network (UTRAN) device, spikes or sudden increases or changes may occur in a measurement of a system load in a CDMA system. For example, the load measurement spikes may be generated by sources, which are not under a power control of the CDMA system. Likewise, the sudden increases or changes in the load measurement may be caused by variations of the CDMA system load, e.g., due to a handover or user activity. As specified in the UMTS 3GPP standard, the load measurement is filtered and pre-processed in a base station, e.g., a Node-B and then reported to a radio network controller (RNC) via a message referred to as a measurement reporting message.

FIG. 2 shows a typical way of handling an uplink load by using one or more load control algorithms in the RNC. As such, the two common load control algorithms include an admission control algorithm, which is applied to prevent the CDMA system from becoming overloaded, and a congestion control algorithm, which is used to bring the CDMA system back into a stable operating condition. In this approach, an uplink load measurement is first converted into a CDMA system load via noise rise. Then, depending on a particular outcome from the load control algorithms, several load control actions may be performed.

Referring to the example depicted in FIG. 2, a set of load control actions for different regions of load may be summarized as follows: (A) in a low load region, e.g., when load< a Dynamic Bearer Control threshold (thr_DBC), the admission control algorithm admits all new traffic requests; (B) in a medium load region, e.g., when a thr_DBC<=load< a Call Admission Control threshold (thr_CAC), the admission control algorithm admits only traffic requests with lower resource consumption, that is, requests with a lower data rate; (C) in a high load region, e.g., when the thr_CAC<=load, the admission control algorithm blocks all incoming call requests; and (D) in a very high load region, e.g., when a Congestion Control threshold (thr_ConC) <=load, the congestion control algorithm reduces the offered traffic by reducing the data rate of one or several users. In the extreme case, the whole connection may be released by this procedure.

To obtain the noise rise in dB, which is used for load control, the difference between the measured RSSI and an estimated background noise (also in dBm) is determined. However, one problem of interference measurements is their sensitivity to interference fluctuations, which may occur due to many different reasons including interference from a CDMA system, interference from other mobile systems, and external interference.

Specifically, the interference from a CDMA system involves a known source of fluctuations, e.g., a mobile user itself. Using the UMTS common channels, under normal conditions, a transmit power control on a dedicated channel (DCH) may maintain the mobile user's transmit power close to a desired transmit power level. However, during establishment of a dedicated connection, an open loop power control is used on either a random access channel (RACH) or for an initial power setting on the DCH. In such a situation, to obtain a relatively fast synchronization, the initial power may be set to a value, which is higher than what may be required. Therefore, for a certain period, a wireless communication device, such as a mobile station transmits with a higher power, causing undesired interference fluctuations at a receiving end, e.g., at a base station, such as a Node B in an uplink.

Adjacent channel interference from mobile communication systems at adjacent frequency bands may cause additional interference. While an adjacent CDMA system may likely cause only a general increase in background noise, time division multiple access (TDMA) systems like Global System of Mobile Communications (GSM) may be a source of substantial fluctuating interference. External interference may cause fluctuations that may not be originated from any mobile user. For example, significant broadband pulses may result due to other types of noise, such as created by an electrical self-starter of a car, power lines, heavy current switches, arc welders, fluorescent lights, and the like.

Referring to FIG. 3, an exemplary RSSI measurement trace obtained from a field measurement is shown over a time period. The RSSI measurement trace illustrates occurrence of some relatively high, short-duration spikes in a system load measurement. As shown, the height of the spikes in a system load measurement may reach as high as 10 dB. Because of the occurrence of the high spikes, a typical load control algorithm causes a typical congestion control to drop existing calls. Such dropping of calls is indeed an undesired outcome of load control given the relatively short duration of these spikes, e.g., in a range of a few 100 milliseconds (msecs). One approach to handle the above described scenario calls for setting the filtering of the RSSI measurement to a very high filtering period. This high filtering period smoothes the spike to lower values, which may not lead to triggering of a load control. Application of high filtering periods will significantly slow the reaction of UL load control during a sudden load increase/decrease. Hence, load control will not be able to react fast enough on such changes by appropriately enabling/disabling the blocking/dropping of calls.

In another approach called an event triggered reporting, a time-to-trigger value may be set to higher values, which would make the reporting of the spikes more unlikely. Similar to higher filtering periods, the increased time-to-trigger will make load control reaction too slow on the load changes. Thus, making it more unlikely, that RSSI spikes will cause CDMA loadings to be above the load control thresholds, especially the thr_ConC. The usage of higher thresholds is risky since same CDMA systems become unstable in a loading region around and above 90%, as shown in FIG. 2. In such a high load condition, the transmit power control essentially functions inadequately, which leads to a much higher risk of dropping ongoing calls due to bad radio frequency (RF) link conditions. Accordingly, the drawbacks set forth above may result in imprecise measurements of system load in a CDMA system. That is, an inaccurate estimate and control of an uplink load may lead to inefficient resource management in many UMTS standard based products including the Node B base stations and UTRAN access networks.

The present invention is directed to overcoming, or at least reducing, the effects of, one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, a method is provided for responding to changes in measurement of a system load in a spread spectrum communication system. The method comprises receiving over a plurality of sampling time periods a first value indicative of received signal strength for the system load within a coverage area, determining duration for a fluctuation in the system load across at least two time periods of the plurality of sampling time periods, and selectively providing a second value different than the first value indicative of received signal strength based on the duration to control the system load.

In another embodiment, a spread spectrum communication system comprises a base station associated with a wireless communication network to communicate with a mobile unit and a controller is coupled to the base station. The controller includes a memory that stores instructions to receive over a plurality of sampling time periods a first value indicative of received signal strength for the system load within a coverage area, determine duration for a fluctuation in the system load across at least two time periods of the plurality of sampling timer periods, and selectively provide a second value different than the first value indicative of received signal strength based on the duration to control the system load.

In yet another embodiment, a radio network controller is provided to control a wireless communication network serving a plurality of base stations capable of communicating with a mobile unit. The radio network controller comprises a controller and a memory coupled to the controller. The memory stores a load control algorithm to receive over a plurality of sampling time periods a first value indicative of received signal strength for the system load within a coverage area, determine duration for a fluctuation in the system load across at least two time periods of the plurality of sampling time periods, and selectively provide a second value different than the first value indicative of received signal strength based on the duration to control the system load.

In still another embodiment, a base station is coupled to a radio network controller in a wireless communication network capable of communicating with a mobile unit. The base station comprises a controller and a memory is coupled to the controller. The memory stores a load control algorithm to receive over a plurality of sampling time periods a first value indicative of received signal strength for the system load within a coverage area, determine duration for a fluctuation in the system load across at least two time periods of the plurality of sampling time periods, and selectively provide a second value different than the first value indicative of received signal strength based on the duration to control the system load.

In another embodiment, an article comprising a computer readable storage medium storing instructions that, when executed cause a spread spectrum communication system to receive over a plurality of sampling time periods a first value indicative of received signal strength for the system load within a coverage area to respond to changes in measurement of the system load in the spread spectrum communication system, determine duration for a fluctuation in the system load across at least two time periods of the plurality of sampling time periods, and selectively provide a second value different than the first value indicative of received signal strength based on the duration to control the system load.

BRIEF DESCRIPTION OF THE DRAWINGS

The invention may be understood by reference to the following description taken in conjunction with the accompanying drawings, in which like reference numerals identify like elements, and in which.

Figure 1:
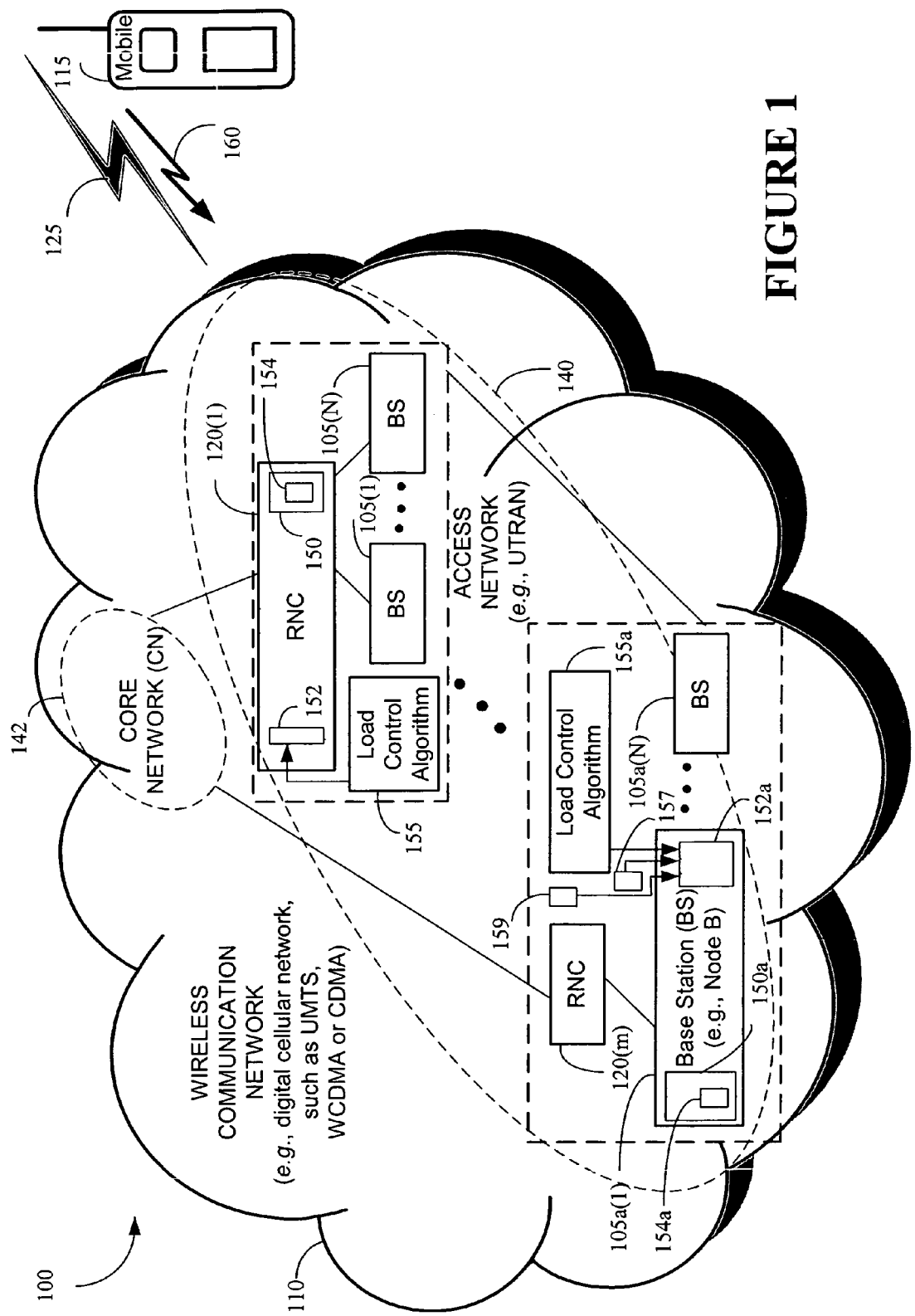
FIG. 1 illustrates a spread spectrum communication system that selectively responds to changes in measurement of a system load includes a radio network controller coupled to a base station for communicating over a wireless communication network to a mobile unit according to one illustrative embodiment of the present invention.
Figure 2:
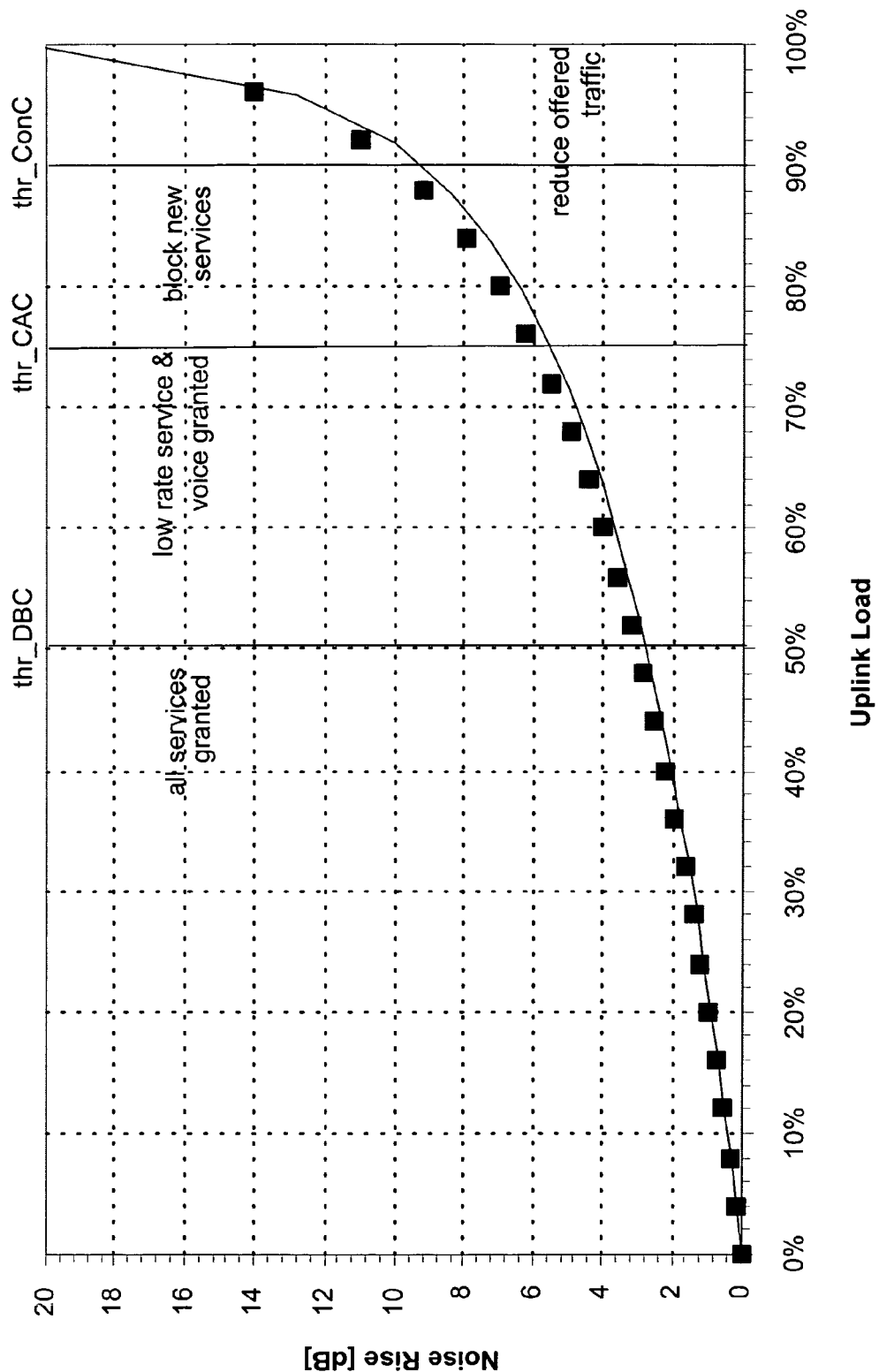
FIG. 2 schematically shows a typical way of handling an uplink load by using one or more load control algorithms in the radio network controller shown in FIG. 1.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and apparatus are provided for responding to a change in measurement of a system load in a spread spectrum communication system. Using a load control algorithm, for example, a CDMA system based on the UMTS may efficiently handle sudden changes or variations, such as spikes or steps in system load measurements for an uplink and/or a downlink between a mobile unit and an access network, such as a UTRAN. The load control algorithm determines whether a sudden variation of a measured system load is generated by a source not under a power control or is caused by a variation of a spread spectrum communication system load. Based on whether the sudden variation is generated by a source or is caused by a variation, a load control measure may be selectively applied to adjust one or more parameters associated with the system load. That is, an increase of a first new measurement value may be limited to a given maximum increment for one sampling time period of a plurality of sampling time periods in response to a spike in the system load or a desired response to a sudden increase of the system load may be delayed by a given maximum number of measurement samples. In this manner, the load control algorithm may respond to relatively large fluctuations in the measured system load by limiting the fluctuations and not attempting to handle such relatively large fluctuations by filtering, threshold setting or other similar complex methods. Moreover, by adjusting of one or more parameters including thresholds, the load control algorithm may be tuned to respond to changes in the measurement of the system load. By limiting the RSSI spike(s), for example, the load control algorithm may handle relatively large fluctuations and efficiently avoid triggering of a congestion control measure, i.e., avoiding unnecessary dropping of calls. By allowing a limited increase, the response of the spread spectrum communication system may be controlled such that some blocking may occur but dropping of calls may be avoided because the load control algorithm may react much faster to sudden changes of a CDMA system load.

Referring to FIG. 1, a spread spectrum communication system 100 includes a plurality of base stations 105(1-N) associated with a wireless communication network 110 to communicate with a mobile unit 115 across a coverage area according to one embodiment of the present invention. The spread spectrum communication system 100 may selectively respond to changes in measurement of a system load. In the spread spectrum communication system 100, such as based on the UMTS standard, a CDMA system load may be measured by interference or power measurements. The CDMA system load may be calculated by: load=1–10^(–NR/10), where noise rise (NR) in dB is defined as NR=RSSI–RSSI_0. The received signal strength indicator (RSSI) may be a measurement of the received signal strength in dBm and RSSI_0 is the background noise in dBm, which is estimated from RSSI measurements at a specific time, e.g., when there is no traffic present in the spread spectrum communication system 100. The estimate may be local (only considering estimates from an associated cell) or may also consider estimates from one or more neighboring cells or sites.

The spread spectrum communication system 100 may include a multiplicity of radio network controllers (RNCs) 120(1-m). While the RNC 120(1) may be coupled to the plurality of base stations 105(1-N), the RNC 120(m) may be coupled to another plurality of base stations 105a(1-N). The coverage area of the spread spectrum communication system 100 may be partitioned into connected service domains known as cells, where a radio device user of the mobile unit 115 may communicate with a communication node, such as the base station 105 or 105a (e.g., Node B) that serves a cell over a wireless communication link 125 over an air interface using radio frequency (RF).

In one embodiment, the mobile unit 115 may be a wireless device, such as a cell phone that may be used whenever a network coverage is provided. However, the mobile unit 115 may be any kind of device capable of communicating with the base stations 105(1-N) and/or the base stations 105a(1-N) in any one of suitable forms of wireless communication for portable cellular and digital phones in addition to handheld and hands-free phones. For example, the mobile unit 115 may be capable of handling cellular signals and may operate according to Code Division Multiple Access (CDMA) standard.

More specifically, the mobile unit 115 may establish the wireless communication link 125 with the base station 105(1) in the wireless communication network 110 within a corresponding geographical area, i.e., a cell in one embodiment. For example, the base station 105(1) may establish the wireless communication link 125 according to a Universal Mobile Telecommunications System (UMTS) protocol. However, persons of ordinary skill in the relevant art would appreciate that the present invention is not limited to the UMTS protocol. In various alternate embodiments, the wireless communication link may be established according to any one of a desired cellular radio telephone protocol including, but not limited to, a CDMA protocol, a personal communication services (PCS) protocol, and a third generation partnership project (3GPP) protocol.

In this way, the mobile unit 115 may communicate with the base station 105(1) within a cell through an assigned channel pair consisting of an uplink frequency and a downlink frequency. An uplink or a reverse communication link refers to a means for transmitting information from the mobile unit 115 to the base station, i.e., the Node B 105(1), for example, over a radio frequency (RF) link, i.e., the wireless communication link 125 that transports data from the mobile unit 115 to the base station 105(1) in an uplink as a portion of a communications link. That is, a RF uplink or a RF reverse link may indicate the transmission of RF signals. Example of a RF link or a RF reverse link includes a link between the mobile unit 115 and the base station 105(1), e.g., a base transceiver station (BTS) or Node B.

The wireless communication network 110 may comprise an access network 140, such as a Universal Mobile Telecommunications System Terrestrial Radio Access Network (UTRAN) for establishing communication at the mobile unit 115 to provide multimedia services. The wireless communication network 110 may further comprise a core network (CN) 142 which may be in turn connected to other networks. Each base station of the plurality of base stations 105(1-N) and the plurality of base stations 105a(1-N) may be coupled to the CN 142 via the radio network controllers 120(1-m) that control the wireless communication network 110.

The core network 142 may manage the traffic from the radio network controllers 120(1-m). For example, the core network 142 may process voice calls using UMTS mobile services switching centers (UMTS-MSCs) or may use a data network such as a General Packet Radio Service (GPRS) network including serving GPRS support nodes (SGSNs). However, persons of ordinary skill in the pertinent art should appreciate that the aforementioned types of networks are exemplary in nature and are not intended to limit the scope of the present invention.

The radio network controller 120(1) may comprise a controller 150 coupled to a memory 152. While the controller 150 may include a load control unit 154, the memory 152 may store a load control algorithm 155 defined at least in part by the UMTS standard, in another embodiment of the present invention. The load control unit 154 may provide a load control measure for applying a set of load control actions for different regions of the system load.

By using the load control unit 154 and the load control algorithm 155, the radio network controller 120(1) may handle any one of fluctuations, changes, variations, or spikes in an uplink load (UL) measurement. In one embodiment, the load control algorithm 155 may react fast enough to provide an UL load control measure in response a sudden system load increase and/or decrease. In turn, the load control unit 154 may be able to react fast enough on such changes with appropriately enabling or disabling of blocking and/or dropping based on the UL load control measure. By avoiding too many users to be admitted into a single cell, in the spread spectrum communication system 100, such as a CDMA system, the load control unit 154 may maintain a desired link quality level for existing users. That is, by avoiding dropping of user calls in a particular cell, the load control algorithm 155 may not affect neighboring cells due to an inter-cell interference.

That is, the radio network controller 120(1) may provide control of radio frequency channels including a dedicated channel (DCH). The radio network controller 120(1) may be capable of assigning radio frequency (RF) spectrum channels to the different cells of a digital cellular network for providing voice, data, or a host of voice and data services in different-generation of wireless networks including digital cellular networks based on standards including Universal Mobile Telecommunications System (UMTS) and 3G-1X (Code Division Multiple Access (CDMA) 2000), as well as IS-95 CDMA.

According to another embodiment of the present invention, the base station 105a(1) associated with the wireless communication network 100 to communicate with the mobile unit 115 may comprise a controller 150a coupled to a memory 152a. While the controller 150a may include a load control unit 154a, the memory 152a may store a load control algorithm 155a may be defined at least in part are by a CDMA protocol based on the UMTS standard, in another embodiment of the present invention. The load control algorithms 155 and 155a may comprise instructions to receive over a plurality of sampling time periods a first value indicative of received signal strength for the system load within a coverage area, determine duration for a fluctuation in the system load across at least two time periods of the plurality of sampling time periods, and selectively provide a second value different than the first value indicative of received signal strength based on the duration to control the system load.

The load control unit 154a may provide a load control measure for applying a set of load control actions for different regions of the system load. The base station 105a(1) may further comprise a scheduler 157 to enable scheduling of a desired amount of network traffic e.g. on enhanced dedicated channel (EDCH) during a next time period. The base station 105a(1) may further include a reporter 159 to periodically measure the system load at the base station 105a(1) associated with the access network 140. The reporter 159 may report the measured system load to the RNC 120(m).

In operation, the base station 105a(1) may use the load control unit 154a and the load control algorithm 155a to handle any one of fluctuations, changes, variations, or spikes in an uplink load (UL) measurement. In one embodiment, the load control algorithm 155a may react or respond in a manner that is fast enough to provide an UL load control measure in response a sudden system load increase or decrease. In turn, the load control unit 154a may be able to react fast enough on such changes with appropriately enabling or disabling of blocking and/or dropping based on the UL load control measure.

Consistent with one embodiment of the present invention, the load control algorithm 155 may selectively respond to changes in the measurement of a system load to accurately estimate the system load in an uplink 160 between the mobile unit 115 and the base station 105(1) in the wireless communication network 110 shown in FIG. 1. The uplink 160 may provide a radio frequency (RF) link from the mobile unit 115 to the base station 105(1).

Using the load control algorithm 155, in one embodiment, the load control unit 154 may determine an uplink load measurement for the uplink 160. Within a UMTS coverage area, e.g., the uplink load measurement may be obtained as RSSI measured in dBm. The load control unit 154 may maintain a desired link quality level for existing users by avoiding too many users to be admitted into a single cell. That is, the load control algorithm 155 may prevent dropping of user calls in a particular cell and may not affect one or more neighboring cells.

Figure 4:
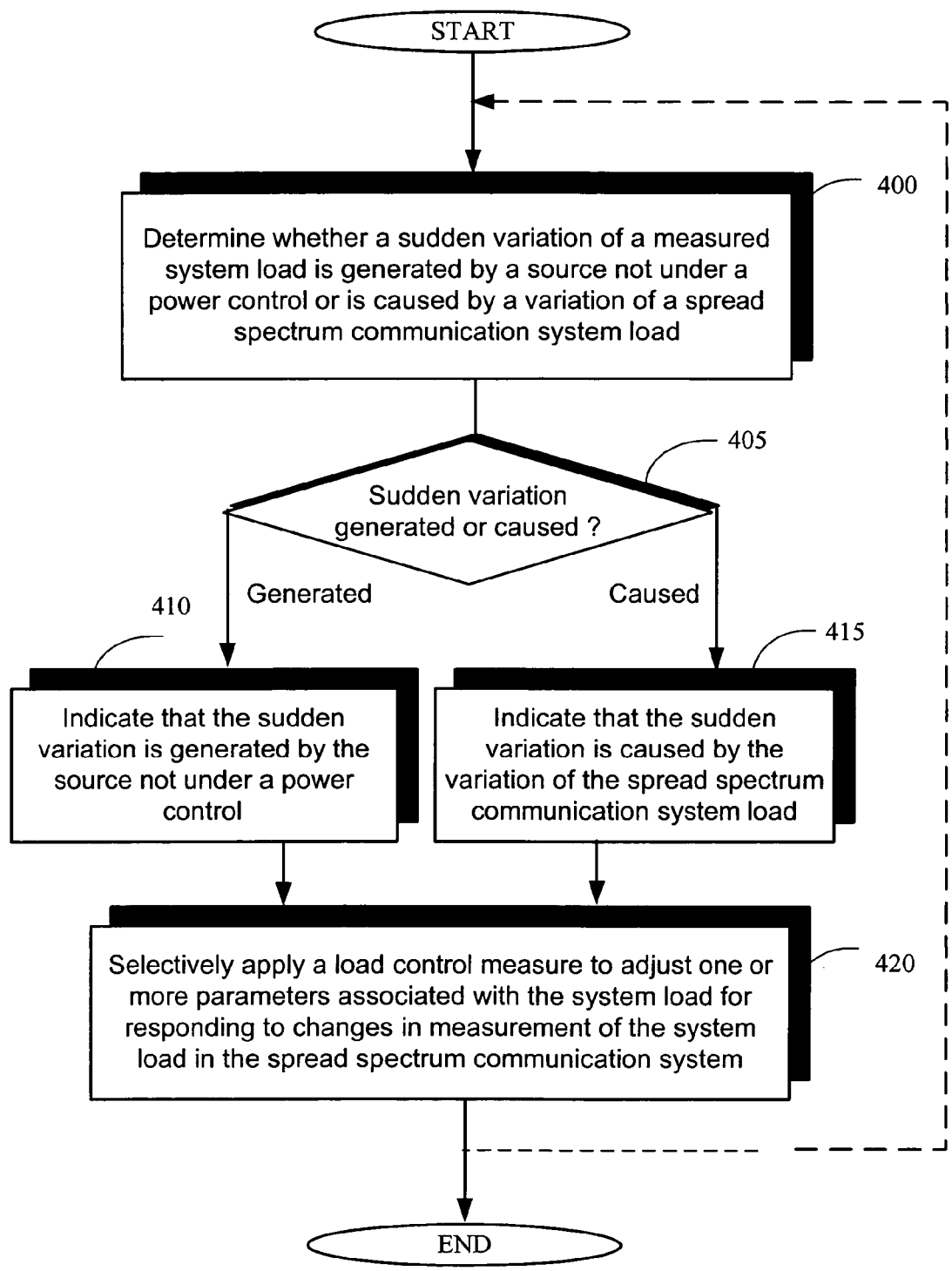
FIG. 4 illustrates a stylized representation of a method for selectively responding to changes in measurement of a system load based on a load control algorithm shown in FIG. 1 according to one illustrative embodiment of the present invention.

Referring to FIG. 4, a stylized representation of a method is illustrated for selectively responding to changes in the measurement of a system load based on the load control algorithm 155 shown in FIG. 1 according to one illustrative embodiment of the present invention. At block 400, the load control unit 154 may determine whether a sudden variation of a measured system load is generated by a source not under a power control or is caused by a variation of the system load in the spread spectrum communication system 100. A decision block 405 may ascertain whether the sudden variation is either generated or caused.

If the sudden variation is determined to be generated, at block 410, the load control unit 154 may indicate that the sudden variation is generated by the source not under a power control. Conversely, if the sudden variation is determined to be caused, at block 415, the load control unit 154 may indicate that the sudden variation is caused by the variation of the system load in the spread spectrum communication system 100. At block 420, the load control unit 154 may selectively apply a load control measure to adjust one or more parameters associated with the system load based on whether the sudden variation is generated by the source or is caused by the variation. In this way, the spread spectrum communication system 100 may respond to changes in measurement of the system load.

Figure 5:
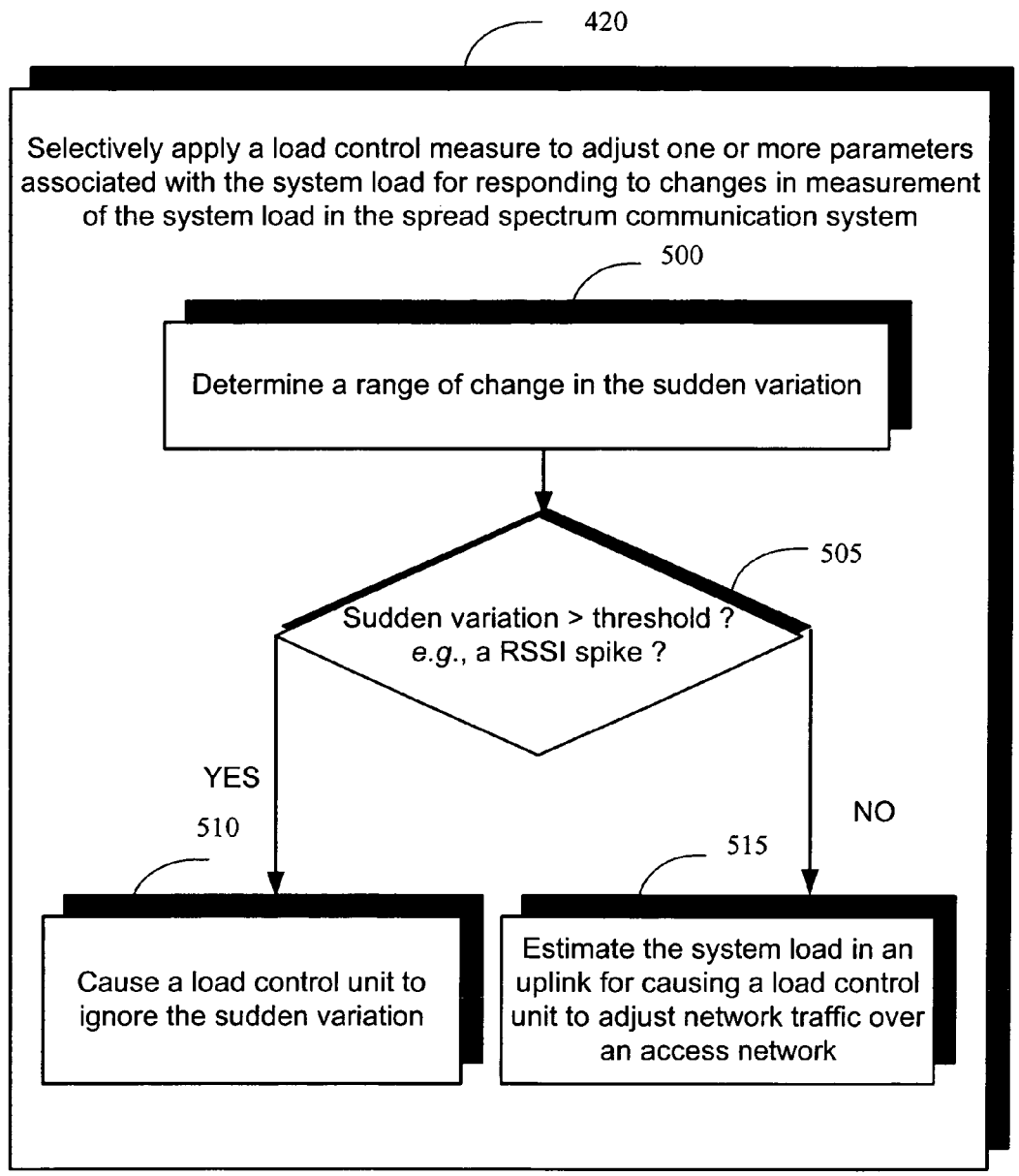
FIG. 5 illustrates a stylized representation of a method for selectively responding to changes in measurement of a system load for accurately estimating the system load in an uplink between the mobile unit and the base station in the wireless communication network shown in FIG. 1 consistent with one embodiment of the present invention.

Turning now to FIG. 5, a stylized representation of a method for selectively responding to changes in measurement of a system load is illustrated based on the load control algorithm 155 shown in FIG. 1 according to one illustrative embodiment of the present invention. Selectively applying the load control measure at block 420 includes determining a range of change in the sudden variation of the measured system load at block 500. Based on the range of change, i.e., the sudden variation of the measured system load fluctuating above a threshold, e.g., occurrence of a received signal strength indicator (RSSI) spike may be detected in the system load at a decision block 505.

If the sudden variation of the measured system load fluctuates above a threshold, i.e., the RSSI spike is detected at the decision block 505, a load control action may be triggered at the load control unit 154. A spike, e.g., the RSSI spike may be detected in the fluctuation relative to a predefined range of a RSSI. By detecting duration of the spike, a comparison of this duration may be performed against a time horizon associated with failure of the wireless communication link 125, e.g., a radio frequency (RF) link shown in FIG. 1.

Specifically, at block 510, the load control algorithm 155 may cause the load control unit 154 to ignore the sudden variation. However, in response to a determination of absence of the RSSI spike, the system load may be estimated in the uplink 160 for causing the load control unit 154 to adjust network traffic over the access network 140. In one embodiment, such an adjustment of a parameter associated with the system load may increase the network throughput of the access network 140 in terms of the network traffic carried in the spread spectrum communication system 100.

The load control unit 154*a* may periodically measure the system load at the base station 105*a*(1) associated with the access network 140. To this end, the load control unit 154*a* may use the reporter 159 to report the measured system load in a reporting event to the RNC 120(*m*). The reporting event may be evaluated to determine whether the source is under a power control and the variation of the system load is based on at least one of the handover and user activity. For example, a step signal measurement may be identified to be a sudden increase in the system load based on at least one of an increase in user activity and an incoming handover of a user to one cell from another cell or from one frequency to another frequency.

However, reporting of measurement of the spike may be ignored without causing an overload in the spread spectrum communication system 100. That is, to suppress the spike before triggering of the reporting event, the load control algorithm 155*a* may be tuned based on the duration of the spike. By limiting an increase caused by the spike to a predefined value of the measured system load, the scheduler 157 at the base station 105*a*(1) may enable scheduling of a desired amount of network traffic.

In this manner, the load control algorithm 155*a* may differentiate the spike generated in the system load by a source that is not under a power control from a sudden change in the systems load in response to a variation of the system load based on at least one of a handover and user activity. A transmit power control may be adapted to an interference. Accordingly, the load control unit 154*a* may appropriately handle the spike and the sudden change in the spread-spectrum communication system 100 that uses a CDMA protocol.

Figure 3:
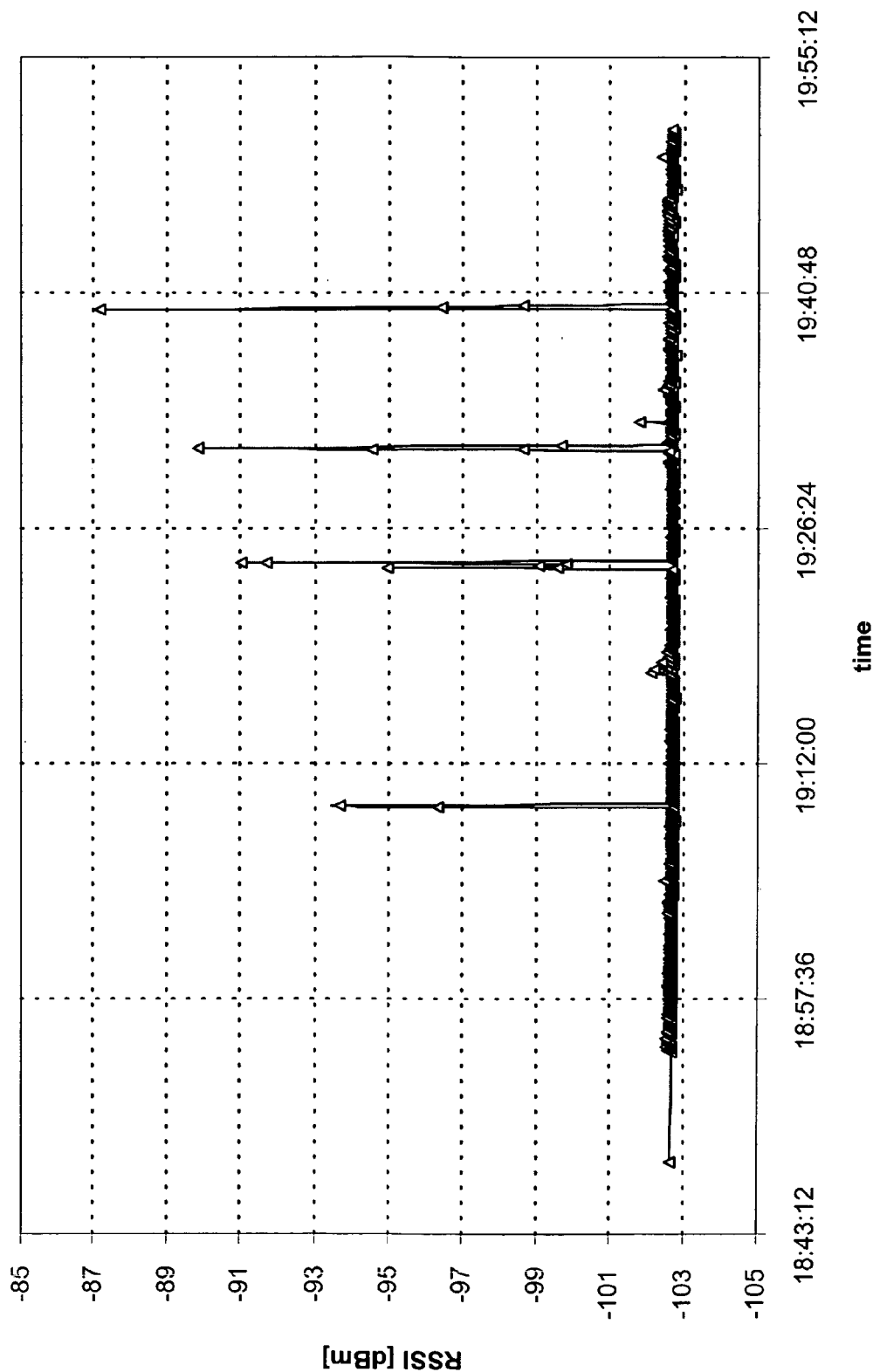
FIG. 3 schematically shows an exemplary RSSI measurement trace obtained from a field measurement over a certain time period to illustrate occurrence of some relatively high spikes in a system load measurement.

To handle the system load measurement fluctuations, the load control algorithms 155 and 155*a* may use the following properties of a fluctuation in the measured system load. The RSSI spike has been observed to have a much higher increase, than it is normally seen by regular or non-RSSI spike fluctuations. As shown in FIG. 3, the RSSI spikes may be in the range of 10 dB and above. The load control algorithms 155 and 155*a* use this property to enable a simple detection of the RSSI spikes.

In other words, because the RSSI spikes are of a relatively short duration, for example, duration of a few milliseconds (ms) such as 100 ms, this duration of is the RSSI spikes much shorter than a time horizon of a radio frequency link failure procedure, which causes, e.g., call or user droppings due to an unacceptable radio frequency link quality. A fluctuation due to a RSSI spike in the measured system load is not originated by a transmit power control. In that case, transmit power control is able to adapt onto a higher interference without causing instability. Based on these properties of the fluctuations that occur in the measured system load due to the RSSI spikes, the load control algorithms 155 and 155*a* may ignore a measurement reporting event of the RSSI spikes without causing an overload in the spread spectrum communication system 100 and bad radio link quality.

Figure 6:
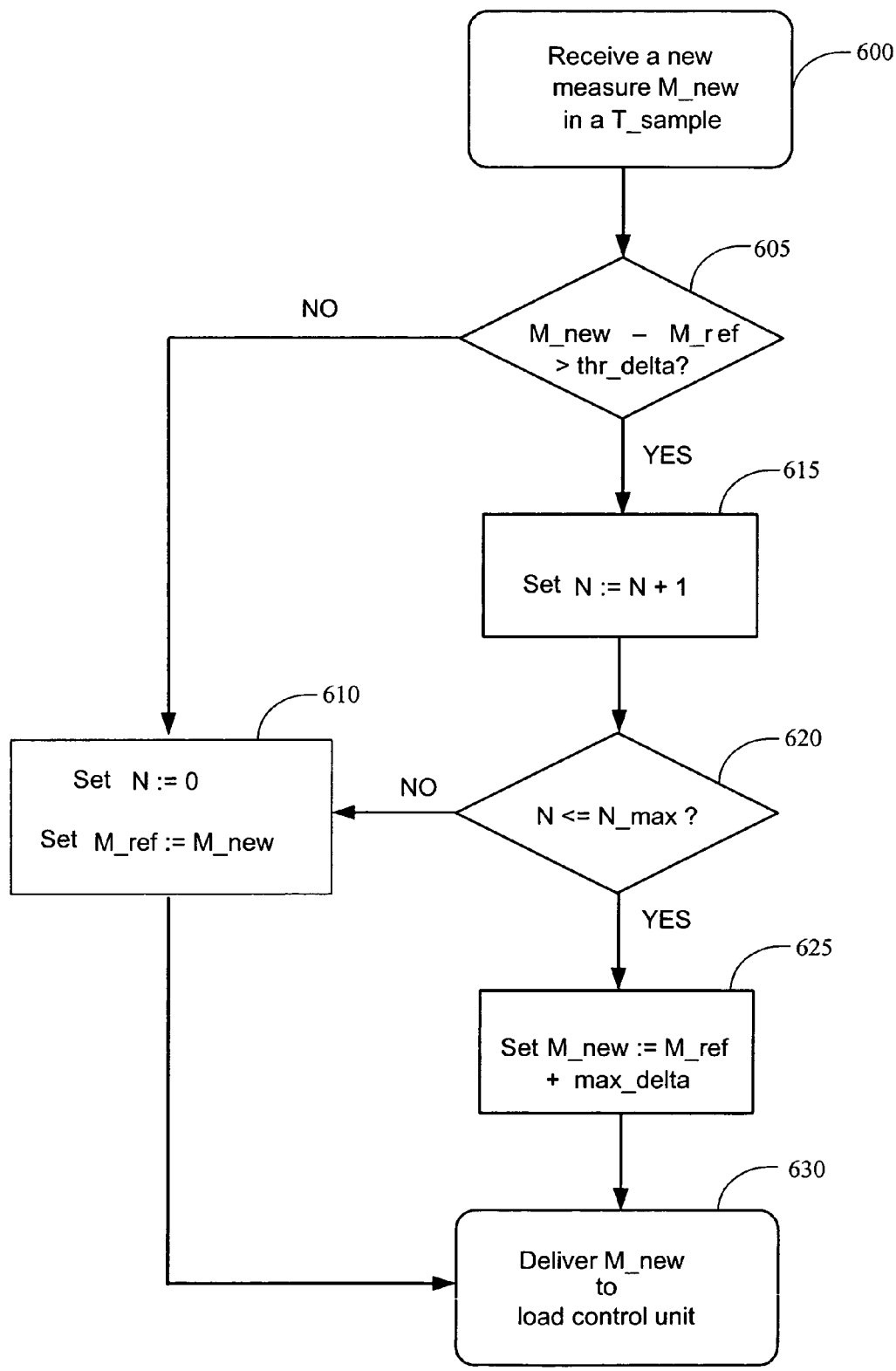
FIG. 6 illustrates a stylized representation of a load control algorithm shown in FIG. 1 according to one illustrative embodiment of the present invention.

Referring to FIG. 6, a stylized representation of the load control algorithms 155 and 155*a* shown in FIG. 1 is illustrated according to one illustrative embodiment of the present invention. At block 600, the load control algorithms 155 and 155*a* may receive over a plurality of sampling time periods a first value indicative of received signal strength for the system load within a coverage area. For example, the first value indicative of received signal strength for the system load within a coverage area may be a new measurement value (M_new) in a T_sample.

That is, the load control algorithms 155 and 155a may be triggered, whenever the new measurement value, M_new, arrives. In one embodiment, a periodical arrival of the M_new value may occur after each T_sample, which may be equal to a predefined measurement period. A check at a decision block 605 may determine whether the load control algorithms 155 and 155a may trigger a measurement limit handling routine. For that purpose, the load control algorithms 155 and 155a may compare the new measurement value, M_new, with a stored reference value, M_ref, indicative of received signal strength for the system load.

By comparing a difference between the new measurement value, M_new, and the stored reference value, M_ref, to a threshold (thr_delta) that selectively limits an increase caused by the fluctuation to a given maximum increment (max_delta) in the new measurement value, M_new, a second value different than the first value indicative of received signal strength for the system load of the new measurement value, M_new, may be selectively provided for the new measurement value, M_new, to the load control unit 154 and/or 154a. The load control algorithms 155 and 155a may determine if M_new−M_ref>thr_delta, then the measurement limit handling is performed or continued, instead, if M_new−M_ref<=thr_delta, then the measurement limit handling is not started and the internal variables are cleared, respectively.

More specifically, if the difference between the first value, i.e., the received new measurement value, M_new and the reference value, M_ref, for the system load is indicated to be less than the threshold, thr_delta, the reference value, M_ref, may be set equal to the first value, M_new. The first value, M_new, may then be delivered to the load control unit 154 and/or 154a to apply a load control measure that ignores the changes in the measured system load. However, if the difference between the first value, M_new, and the reference value, M_ref, exceeds the threshold, thr_delta, a measurement limit handling may be triggered for a given maximum number of measurement samples (N_max) handled by a same limit level. Using the measurement limit handling, the reference value, M_ref, may be added to the given maximum increment, max_delta, so that the received first value, M_new, may be set equal to the second value, i.e., the increased first value M_new. This second value, M_new, may be delivered to the load control unit 154 and/or 154a to apply a load control measure that adjusts one or more parameters associated with the system load.

At block 610, the measurement limit handling is not applied, and if desired, the counter, N, may be reset to N=0. The reference variable, M_ref, may be set to the current value of the received signal strength of the received first value, i.e., M_ref=M_new. At block 615, a counter, N, may be incremented by N=N+1. At a decision block 620, a check determines if the counter, N, exceeds the threshold, N_max. The load control algorithms 155 and 155a may determine if N>N_max, then the counter, N, expires, i.e., the measurement limit handling is no more applied and the internal variables are cleared. However, if N<=N_max, then the measurement limit handling may be reapplied.

At block 625, the received first value, i.e., the new measurement value may be limited to M_new=M_ref+max_delta. At block 630, the load control algorithms 155 and 155a may end. In other words, the new measurement value, M_new, which is either the received first new measurement value or the limited second value, may be delivered to the load control unit 154 and/or 154a. The new reference value, M_ref, and a counter, N, value may be stored to be used when a next measurement arrives.

According to one illustrative embodiment of the instant application, the load control algorithms 155 and 155a may use one or more tunable parameters including, but not limited to, the given maximum number of measurement samples, N_max, which may be handled by the same limit level. The setting of this parameter may depend upon a relation between the sampling period, T_sample, and the duration of the spike that may be handled by the load control algorithms 155 and 155a. For example, the N_max parameter ideally may be set at least equal to one.

Another tunable parameter may be the threshold, thr_delta, indicating when the measurement limit handling may be applied. For example, the thr_delta parameter ideally may be set as thr_delta>=0. Yet another tunable parameter may be the max_delta, the maximum increment in the measurement value M_new, which is allowed, when the load control algorithms 155 and 155a are triggered. For example, the max_delta may ideally be set lower than the thr_delta, i.e., 0<=max_delta<thr_delta. A setting of max_delta=0 may fully suppress the spike, i.e., the measurement value M_new may not change from a previous value.

The internal variables to the load control algorithms 155 and 155a may include, but are not limited to, a new measurement value variable, M_new, which may start as a new input sample and may be modified at the end of one iteration of load control algorithms 155 and 155a to a value delivered to load control units 154 and/or 154a, respectively. Another internal variable may be a reference value variable, M_ref, that may be used internally to the load control algorithms 155 and 155a to compare against an incoming measurement value. At the beginning, the M_ref variable may be initialized to the first value, i.e., the received new measurement, M_new Likewise, a counter variable, N, may be used internally within the load control algorithms 155 and 155a and may be used to compare against the N_max. At the beginning, the N variable may be initialized to N=0.

In this manner, the load control algorithms 155 and 155a may either limit an increase of the received first value, M_new, to the given maximum increment, max_delta, for one sampling time period of the plurality of sampling time periods in response to a spike in the measured system load or delay a desired response to a sudden increase of the measured system load by the given maximum number of measurement samples (N_max). The load control algorithms 155 and 155a may determine duration for a fluctuation in the system load across at least two time periods of the plurality of sampling time periods, and selectively provide a second value different than the first value indicative of received signal strength based on the duration to control the system load.

Figure 7:
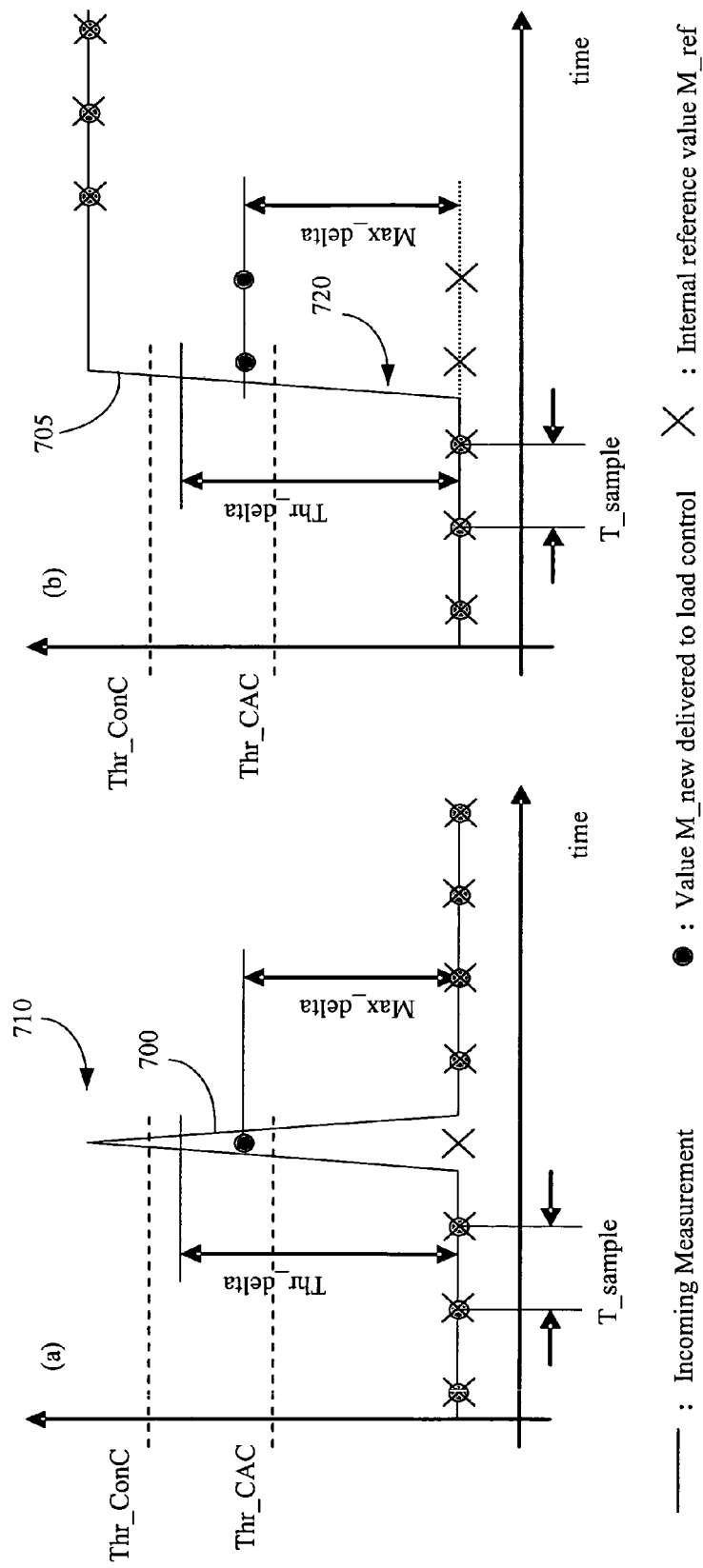
FIG. 7 illustrates a stylized representation of response of the load control algorithm shown in FIG. 6 on a spike signal (a) and on a step increase (b) in a Universal Mobile Telecommunications System Terrestrial Radio Access Network (UTRAN) according to one illustrative embodiment of the present invention.

Finally, FIG. 7 illustrates a stylized representation of response of the load control algorithms 155 and 155a shown in FIG. 6 on a spike signal 700, as shown in (a) and on a step increase 705 as shown in (b) in a Universal Mobile Telecommunications System Terrestrial Radio Access Network (UTRAN) according to one illustrative embodiment of the present invention. The spike signal 700 may be caused due many reasons as set forth above and the step increase 705 may be caused by a sudden increase in system loading of the spread spectrum communication system 100. As shown in FIG. 6, a first value of an input measurement, i.e., the measurement M_new may be delivered to the load control algorithms 155 or 155a for an internal reference variable, M_ref. Likewise, T_sample, may refer to a measurement reporting or sampling period, which in case of RNC uplink load control may be in the order between 1 to 2 seconds.

In the example shown in FIG. 7(a), a short spike 710 in the measurement value, M_new, of the system load is illustrated above the threshold, thr_delta. Absent the use of the load control algorithms 155 or 155a, the received signal strength may increase above a threshold; thr_ConC, leading to unintended dropping of one or more users. By limiting an increase to the given maximum increment, max_delta, for one sample time period, the load control algorithms 155 or 155a may avoid dropping calls of such user(s), for example. The max_delta variable may be set in the way such that when the thr_CAC is exceeded, an admission control measure may block any new call requests for the measurement reporting or sampling period, T_sample, preventing further overloading of the spared spectrum communication system 100.

The example in FIG. 7(b), illustrates a sudden increase 720 in the measured system load, which may occur due to an increase of system load in the spread spectrum communication system 100, e.g., due to an increased activity of the users or due to incoming handover from other cells or frequencies. In that scenario, instead of responding to the sudden increase 720 by triggering an overload measure, which may drop one or more existing users, the load control algorithms 155 or 155a may delay a desired response by, N_max (e.g., at least two) sampling time periods, T_sample. Because a reported value of the measured system load is above the threshold, thr_CAC, for the admission control measure, any new call requests may be blocked, preventing further overloading of the spared spectrum communication system 100.

Consistent with one embodiment of the instant invention, one application of the load control algorithm 155 may significantly improve load control handling in the RNC 120(1) shown in FIG. 1. Such application of the load control algorithm 155 may substantially improve an already implemented load control measure by having a periodical measurement reporting from the base station 105(1), e.g., the Node B with a sampling or reporting measurement period of T_sample=1 to 2 seconds. For such a long sampling or reporting measurement period, the variable N_max=1 may be used.

Another application of the load control algorithm 155a may significantly improve the base station 105a(1), e.g., the Node B measurement reporting. For example, the reporting event evaluation may be substantially improved by such application of the load control algorithm 155a. In that case, one or more raw physical layer (PHY) measurement samples, which are usually taken in each T_sample=100 msec, may be appropriately handled. That is, one or more spikes may be efficiently suppressed before triggering of a reporting event occurs. For this scenario, the variable N_max, greater than one may be used and used to tune the response to changes in measurement of the system load.

In some embodiments, the load control algorithm 155a may perform according to the duration of the spike(s) and an implementation of the load control algorithm 155a may not result in any change in a load control measure at the RNC 120(m), since only the base station 105a(1), e.g., the Node B is affected. The load control algorithm 155a may advantageously be deployed for an internal dynamic scheduling at the base station 105a(1). For example, an improved dynamic scheduling may be provided for enhanced dedicated channel (E-DCH) based on the specification for 3GPP UMTS Rel.6.

On this enhanced dedicated channel (E-DCH), dynamic scheduling may be applied in the base station 105a(1), i.e., the Node B, which relies upon accurate uplink (UL) interference measurement Although a short RSSI spike may not lead to an immediate dropping of call(s), the load control algorithm 155a may block the scheduler 157 over a certain time period from any transmission. In this scenario, the load control algorithm 155a may efficiently limit an increase caused by such spikes to a new measurement, M_new value, which may still allow scheduling of a desired amount of data during a next time period. To support relatively faster reaction on sudden load increases, which are more likely in a scheduled system, the variable N_max may not be set much larger than one since the sampling or reporting measurement period may be set shorter than 100 msec, in some embodiments.

In this manner, the load control algorithm 155a may handle relatively large fluctuations in the measured system load by limiting the fluctuations and not attempting to handle such relatively large fluctuations by filtering, threshold setting or other similar complex methods. Moreover, by adjusting of the parameters thr_delta, max_delta, and N_max, the load control algorithm 155a may be desirable tuned to respond to changes in the measurement of the system load. In this way, the load control algorithm 155a may be applied to a variety of load control applications, such as for load control on a dedicated channel (DCH) in the RNC 102(1), for improving measurement report evaluation in the base station 105a(1), i.e., the Node B and for improving dynamic scheduling on a Enhanced-Uplink Dedicated Channel (E-DCH) in the base station 105a(1), i.e., the Node B.

By limiting the RSSI spike(s), the load control algorithm 155a may handle relatively large fluctuations and efficiently avoid triggering of a congestion control measure, i.e., avoiding unnecessary dropping of calls. By allowing a limited increase, the response of the spread spectrum communication system 100 may be controlled such that some blocking may occur but dropping of calls may be avoided because the load control algorithm 155a may react much faster to sudden changes of a CDMA system load. In particular, a sudden load decrease may be directly indicated to the load control unit 154a without further delay. By adjusting the parameters including thr_delta, max_delta, and N_max and by changing thr_delta and max_delta, the load control algorithm 155a may be tuned from fully suppression of the RSSI spike (s) up to a full disabling of the load control algorithm 155a. Moreover, the time horizon of the load control algorithm 155a may be controlled by a desired setting of the variable, N_max.

Consistent with another embodiment, the load control algorithms 155 and 155a may limit relatively large fluctuations in a downlink of the spread spectrum communication system 100, for example, a CDMA system. In doing this, a measurement base may be set as the total transmit power at a base station 105, i.e., a Node B, which is also known as transmitted signal strength indicator (TSSI). Accordingly, the load control algorithms 155 and 155a may implement a relatively fast overload control in the spread spectrum communication system 100. However, fluctuations in the measured system load on the downlink may be much smaller than the fluctuations in the uplink 160 shown in FIG. 1.

Advantageously, the load control algorithms 155 and 155a may be combined with other load control measures in the CDMA system. For example, an improved UL admission control may be provided. The improved UL admission control may be based on a CDMA system load derived from UL interference and a CDMA load estimate from traffic measurement besides an indication of the radio frequency link quality obtained in terms of a block error rate (BLER) being a measure of the average number of raw channel errors that provides a ratio of the number of erroneous blocks to the total number of blocks received. The BLER may be measured after channel de-interleaving and decoding by evaluating a cyclic redundancy check (CRC) on each transport block and used for WCDMA performance tests, such as demodulation tests in multi-path conditions. Furthermore, the load control algorithms 155 and 155a may improve scheduling on the Enhanced-Uplink Dedicated Channel (E-DCH) as specified in the 3GPP standard (Release 6).

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission mediums. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for responding to changes in measurement of a system load in a spread spectrum communication system, the method comprising:

receiving over a plurality of sampling time periods a first value indicative of received signal strength for said system load within a coverage area;

determining a duration for a fluctuation in the system load across at least two time periods of said plurality of sampling time periods; and selectively providing a second value different than said first value indicative of received signal strength based on said duration to control the system load.

2. A method, as set forth in claim 1, further comprises:
comparing a difference between said first value indicative of received signal strength and a reference value of said received signal strength for said system load to a threshold that selectively limits an increase caused by said fluctuation to a given maximum increment in said first value.

3. A method, as set forth in claim 2, further comprises:
if said difference between said first value and said reference value for said system load is less than said threshold, setting said reference value equal to said first value; and
delivering said first value to a load control measure that ignores the changes in the measured system load.

4. A method, as set forth in claim 2, further comprises:
if said difference between said first value and said reference value for said system load exceeds said threshold, triggering a measurement limit handling for a given maximum number of measurement samples handled by a same limit level;
adding said reference value to said given maximum increment in said first value to set said first value equal to said second value; and
delivering said second value to a load control measure that adjusts one or more parameters associated with the system load.

5. A method, as set forth in claim 4, further comprises:
selectively at least one of limiting an increase of said first value to said given maximum increment for one sampling time period of said plurality of sampling time periods in response to a spike in the system load and delaying a desired response to a sudden increase of the system load by said given maximum number of measurement samples handled by a same limit level.

6. A method, as set forth in claim 1, further comprises:
determining whether a sudden variation of a measured system load is generated by a source not under a power control or is caused by a variation of said spread spectrum communication system load; and
selectively applying a load control measure to adjust one or more parameters associated with the system load based on whether said sudden variation is generated by said source or is caused by said variation.

7. A method, as set forth in claim 6, further comprises:
determining a range of change in said sudden variation;
detecting occurrence of a received signal strength indicator spike in said system load based on said range of change; and
in response to said received signal strength indicator spike, causing a load control unit to ignore said sudden variation.

8. A method, as set forth in claim 7, further comprises:
in response to a determination of absence of said received signal strength indicator spike, estimating the system load in an uplink for causing a load control unit to adjust network traffic over an access network to increase the network throughput of said access network in terms of the network traffic carried in said spread spectrum communication system.

9. A method, as set forth in claim 1, further comprises:
detecting a spike in said fluctuation relative to a predefined range of a received signal strength indicator; and
detecting duration of said spike to compare against a time horizon associated with failure of a radio link.

10. A method, as set forth in claim 1, further comprises:
adapting a transmit power control to an interference.

11. A method, as set forth in claim 1, further comprises:
differentiating a spike generated in the system load by a source that is not under a power control from a sudden change the system load in response to a variation of the system load based on at least one of a handover and user activity to handle said spike and said sudden change in said spread-spectrum communication system that uses a CDMA protocol.

12. A method, as set forth in claim 11, further comprises:
ignoring reporting of measurement of said spike without causing an overload in said spread spectrum communication system.

13. A method, as set forth in claim 12, further comprises:
evaluating a reporting event to determine whether said source is under a power control and said variation of the system load is based on at least one of said handover and user activity.

14. A method, as set forth in claim 13, further comprises:
periodically measuring the system load at a base station associated with said access network; and
reporting the measured system load to a radio network controller.

15. A method, as set forth in claim 14, further comprises:
tuning a response of a load control algorithm based on said duration of said spike to suppress said spike before triggering of said reporting event.

16. A method, as set forth in claim 15, further comprises:
limiting an increase caused by said spike to a predefined value of the measured system load such that a scheduler at a base station enables scheduling of a desired amount of network traffic during a next time period.

17. A method, as set forth in claim 16, further comprises:
identifying a step signal measurement to be a sudden increase in the system load based on at least one of an increase in user activity and an incoming handover of a user to one cell from another cell or from one frequency to another frequency.

18. A spread spectrum communication system, comprising:
a base station associated with a wireless communication network to communicate with a mobile unit; and
a controller coupled to said base station, said controller including a memory storing instructions to receive over a plurality of sampling time periods a first value indicative of received signal strength for said system load within a coverage area, determine a duration for a fluctuation in said system load across at least two time periods of said plurality of sampling time periods, and selectively provide a second value different than said first value indicative of received signal strength based on said duration to control the system load.

19. A spread spectrum communication system, as set forth in claim 18, wherein said spread spectrum communication system defined at least in part by a Code Division Multiple Access protocol based on the Universal Mobile Telecommunications System standard.

20. A spread spectrum communication system, as set forth in claim 18, wherein said wireless communication network defined at least in part by the Universal Mobile Telecommunications System Terrestrial Radio Access Network standard.

21. A radio network controller to control a wireless communication network serving a plurality of base stations capable of communicating with a mobile unit, the radio network controller comprising:

a controller; and a memory coupled to said controller, said memory storing a load control algorithm to receive over a plurality of sampling time periods a first value indicative of received signal strength for said system load within a coverage area, determine a duration for a fluctuation in said system load across at least two time periods of said plurality of sampling time periods, and selectively provide a second value different than said first value indicative of received signal strength based on said duration to control the system load.

22. A radio network controller, as set forth in claim 21, wherein said load control algorithm defined at least in part are by a Code Division Multiple Access protocol based on the Universal Mobile Telecommunications System standard.

23. A base station coupled to a radio network controller in a wireless communication network capable of communicating with a mobile unit, the base station comprising:

a controller; and a memory coupled to said controller, said memory storing a load control algorithm to receive over a plurality of sampling time periods a first value indicative of received signal strength for said system load within a coverage area, determine a duration for a fluctuation in said system load across at least two time periods of said plurality of sampling time periods, and selectively provide a second value different than said first value indicative of received signal strength based on said duration to control the system load.

24. A base station, as set forth in claim 23, further comprising:

a scheduler to enable scheduling of a desired amount of network traffic during a next time period; and a reporter to periodically measure the system load at said base station associated with an access network and report the measured system load to a radio network controller, wherein said load control algorithm defined at least in part are by a Code Division Multiple Access protocol based on the Universal Mobile Telecommunications System standard.

25. An article comprising a computer readable storage medium storing instructions that, when executed cause a spread spectrum communication system to:

receive over a plurality of sampling time periods a first value indicative of received signal strength for said system load within a coverage area to respond to changes in measurement of the system load in said spread spectrum communication system;

determine a duration for a fluctuation in the system load across at least two time periods of said plurality of sampling time periods; and selectively provide a second value different than said first value indicative of received signal strength based on said duration to control the system load.

* * * * *